United States Patent [19]

Pederson

[11] Patent Number: 5,186,646
[45] Date of Patent: Feb. 16, 1993

[54] CONNECTOR DEVICE FOR COMPUTERS

[76] Inventor: William A. Pederson, 6500 Brown Thrush Trail, Eden Prairie, Minn. 55346

[21] Appl. No.: 821,690

[22] Filed: Jan. 16, 1992

[51] Int. Cl.⁵ .............................................. H01R 13/64
[52] U.S. Cl. ..................................... 439/374; 439/540
[58] Field of Search ............... 439/368, 379, 392, 529, 439/540; 361/392, 395, 399, 413, 424, 426

[56] References Cited

U.S. PATENT DOCUMENTS

| | | |
|---|---|---|
| 2,879,491 | 3/1959 | Shapiro . |
| 3,842,389 | 10/1974 | Glover et al. . |
| 4,215,236 | 7/1980 | Reiser . |
| 4,605,275 | 8/1986 | Pavel ..................................... 439/540 |
| 4,659,166 | 4/1987 | Morningstar et al. . |
| 4,870,702 | 9/1989 | Azzouni . |
| 4,939,622 | 7/1990 | Weiss et al. . |
| 4,941,841 | 7/1990 | Darden et al. . |
| 4,991,058 | 2/1991 | Watkins et al. . |
| 5,027,257 | 6/1941 | Lockwood et al. ............ 361/395 X |
| 5,055,067 | 10/1991 | Field . |
| 5,136,468 | 8/1992 | Wong et al. ..................... 361/413 X |

*Primary Examiner*—Eugene F. Desmond
*Attorney, Agent, or Firm*—Vidas & Arrett

[57] ABSTRACT

A connecting device for positioning a plurality of peripheral connectors in relative positions for registration with a plurality of corresponding computer ports. The connecting device has a body having a plurality of peripheral connector holding means for securely holding and positioning a plurality of peripheral connectors, each peripheral connector holding means being located in the body so as to position a peripheral connector held therein in a registering position with respect to a predetermined port of the computer, whereby the computer ports register for direct attachment and detachment to a plurality of peripheral connectors.

6 Claims, 2 Drawing Sheets

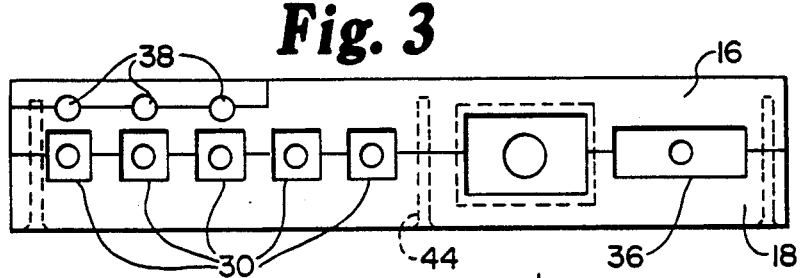
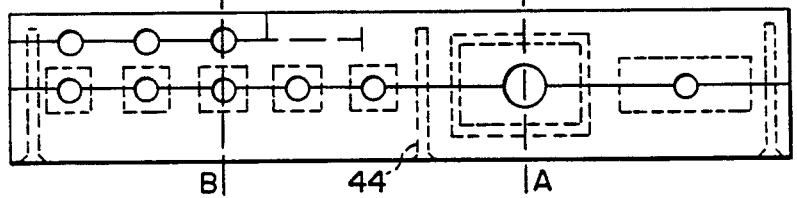
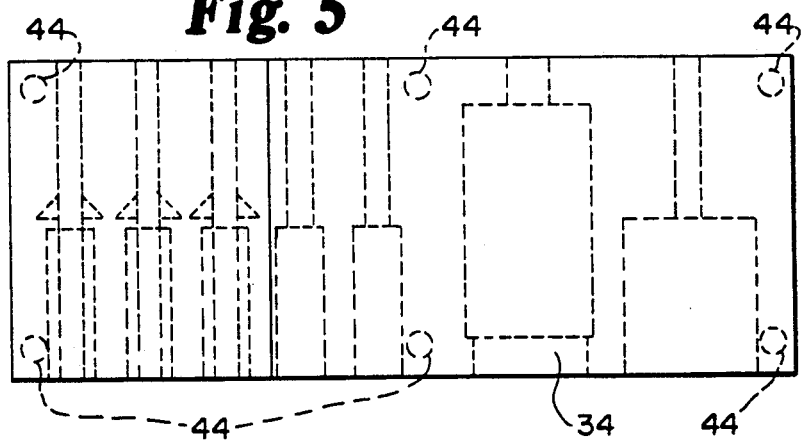
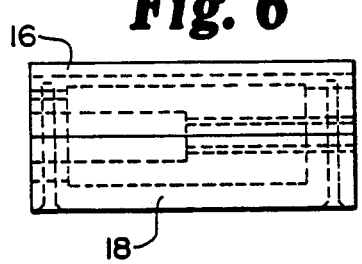
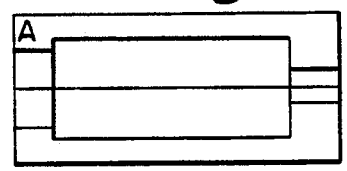
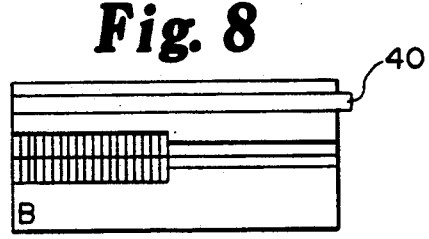
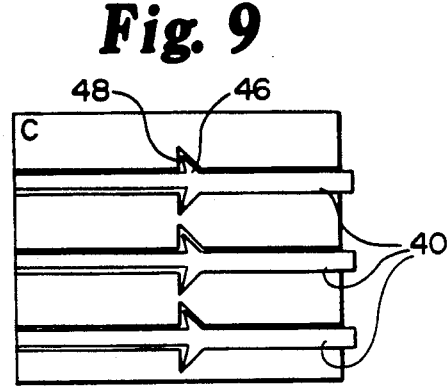

CONNECTOR DEVICE FOR COMPUTERS

BACKGROUND OF THE INVENTION

1. Field Of The Invention

This invention relates to a connecting device, and more particularly to a connecting device for allowing a computer, such as a portable computer, to easily and quickly be connected to a plurality of peripheral devices in one connecting motion.

2. Background of the Related Art

Currently "docking stations" are used for connecting a notebook or portable computer to a variety of external peripherals. Docking stations are electrical devices that run off AC or DC power and which mate with an electrical connector specifically designed to interface with a particular series or model of notebook or portable computer. Docking stations were created to add functionality to the notebook computer by providing space and power for other electric or peripheral attachments which the notebook computer does not have, due to its size or power limitation. Docking stations are fairly expensive devices, frequently running between $500 and $2000.

What is needed is a less expensive way of easily connecting a portable or lap top computer to a plurality of peripheral devices.

SUMMARY OF THE INVENTION

The inventive connector device provides an inexpensive and simple approach to connecting a laptop or notebook computer to a variety of peripheral devices. However, the connecting device described herein could also be used to connect a desktop computer to a plurality of external peripherals.

The connecting device consists of a connector block and positioning shell, although the invention could be used with simply the connector block by itself. Both of these parts are made of injection molded plastic which, together with the fact that the connector device does not require power, allows the device to be fairly inexpensive, relative to a "docking station". The connector block is made of two pieces, each piece having a plurality of cut outs which, when the two pieces of the connector block are attached form cavities which are sized to fit different types of peripheral connectors. The cavities in the connector block are positioned to correspond to the position of predetermined ports on the back of the computer. This invention will be described in connection with a line of portable Macintosh computer called PowerBook, although this invention could be adapted to work with any computer simply by providing a connector block with connector cavities positioned in the proper locations.

A PowerBook computer may be attached to the following external peripheral devices: a modem; a network; an external floppy disk drive; an external hard disk drive; a keyboard; a mouse; a power supply, or an audio input or output device. Each or all of these devices can be attached to the portable computer to provide a more powerful system. Each of these devices is attached to the portable computer via a peripheral connector, whether it is an RJ-11 connector in the case of a modem, a coaxial connector in the case of a network, etc. as is well known in the art. Attaching all of these peripheral connectors to your portable computer to take advantage of all the peripherals takes quite a bit of time and involves matching and aligning various connectors, and requires a minimum degree of knowledge, since many of the peripheral connectors look quite similar.

Use of the inventive connector device is quite simple. The user simply separates the connector block into its two halves, positions the peripheral connectors into the appropriate cavity and reattaches the two halves, which thereby securely clamp or hold the peripheral connectors in their propose positions. The user then slides the computer into the positioning shell and can mate the computer ports of the computer with the connectors held by the connector block in one simple connecting motion.

BRIEF DESCRIPTION OF THE DRAWINGS

FIG. 3 is a front view of the connector block;

FIG. 4 is a rear view of the connector block;

FIG. 5 is a top view of the connector block

FIG. 6 is a side view of the connector block;

FIG. 7 is a cross-sectional view of the connector block taken along line A—A of FIG. 4;

FIG. 8 is a cross-sectional view of the connector block taken along line B—B of FIG. 4, and FIG. 9 is cross-sectional view of the connector block taken along line C—C of FIG. 4.

DESCRIPTION OF THE PREFERRED EMBODIMENTS

Figure 1:
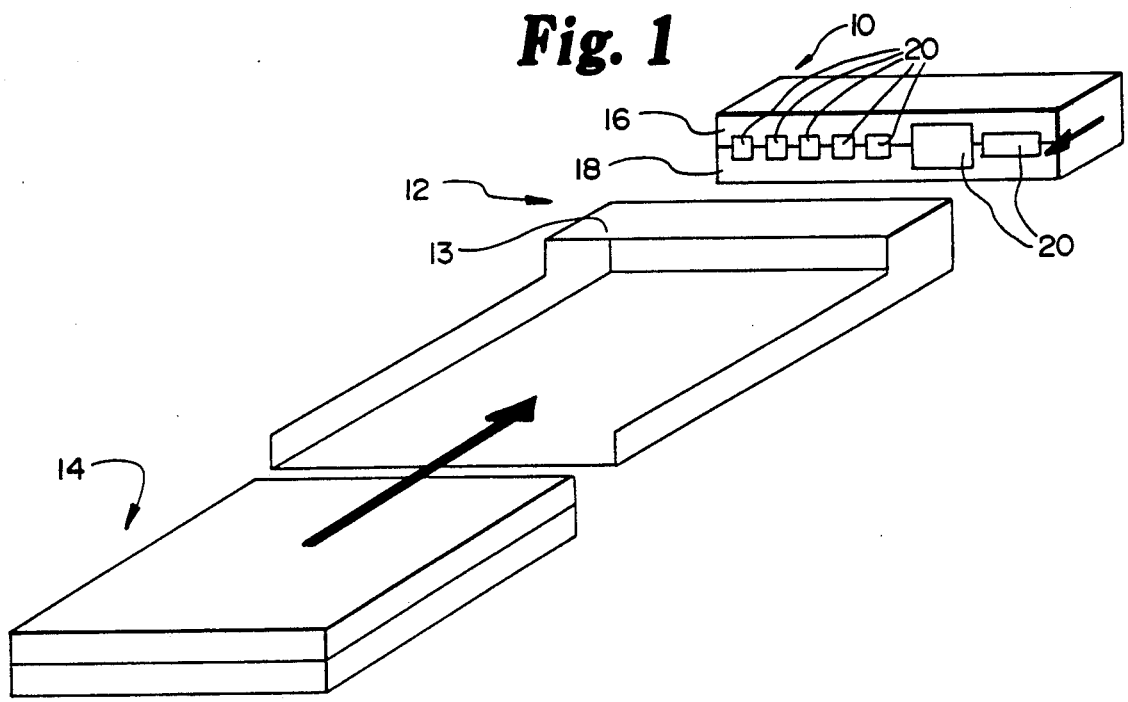
FIG. 1 is a perspective view of a first embodiment of the inventive connector block.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, a first embodiment of the inventive connecting device is shown in which the connector block is shown generally at 10, the positioning shell is shown generally at 12 and the portable computer is shown generally at 14. Both the connector block 10 and the positioning shell 12 are made of injection molded plastic, as is well known in the art. Connector block 10 is made of two halves, shown respectively at 16 and 18 which are attached to each other with screws (described further below). Connector halves 16 and 18 are each provided with a predetermined number of cutouts which, when the two hales are attached together form a plurality of peripheral connector cavities 20. Connector cavities 20 are each designed to hold a particular connector, which in turn correspond to the connectors on the back of the particular model of portable computer to be used with that particular connector block design. This invention is described in connection with a line of portable computers provide by Apple Computer called PowerBook. However, it should be understood that this invention could be used in connection with any portable or desk top computer simply by providing properly located connector cavities within a connector block of the proper shape to correspond with various computers and their ports.

In use, the peripheral connectors are placed in their respective cavities 20 in the connector block 10. Connector block 10 is slid into the raised portion 13 of positioning shell 12, which registers the connectors secured in connector block 10 for direct mating with their corresponding ports on computer 14. Computer 14 is slid into positioning shell 12 until the computer 14 is adjacent connector block 10, thereby connecting the computer 14 to all of its peripherals with one quick connecting motion.

It should be understood that the positioning shell 12, while preferred for ease of alignment of the connector block 10 with respect to the computer 14, is not considered critical to the invention. With a little care, a user could manually align the computer 14 with the connector block 14 for direct mating of the peripheral connectors in connector block 10 with the ports on computer 14.

Figure 2:
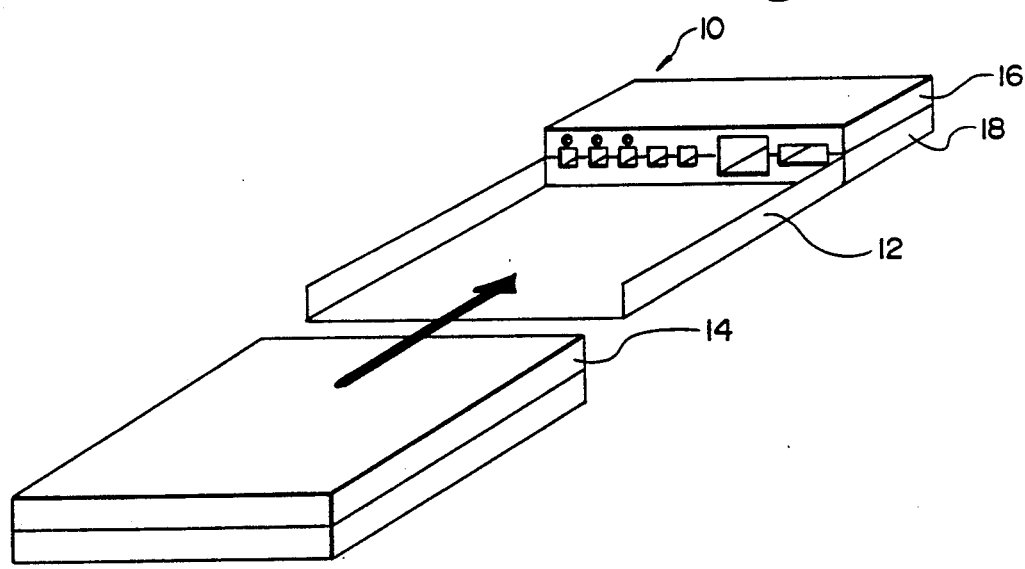
FIG. 2 is a perspective view of a second embodiment of the inventive connector block.

Referring now to FIG. 2, an alternative embodiment of FIG. 1 is shown in which the lower portion 18 of connector block 10 and the positioning shell 12 are formed of one piece of injection molded plastic. In use, connector block 10 is separated into its two halves 16 and 18. The various connectors are positioned in their proper cavity 20 and connector block 10 is reassembled. This clamps or secures the connectors in position, ready for registration with the ports on the computer. Connector block 10 is then slid into positioning shell 12. Positioning shell 12 also slidably receives computer 14 and therefore aligns connector block 10 with computer 14 with a light pressure on the computer, the ports of the computer make direct connection with the peripheral connectors held by connector block 0, since the connector device acts so as to register the peripheral connectors for direct attachment with the ports of computer.

Referring now to FIG. 3, a front view of connector block 10 is shown. Reference numerals 30 represent square cross sectional cutouts molded into the top and bottom halves 16 and 18 of the connector block 10. As can be seen best in FIG. 4, the rear opening of cutouts or connector cavities 30 are circular to allow the cable to exit and also provide some strain relief, although this is not considered critical to the invention. All that is required is that cavities 30 be formed so as grip or clamp peripheral connectors to position them relative to the front of connector block 10. Connector cavities 30 accept connectors for Apple Desk Top Bus (ADB) devices, serial devices, modems, audio input and output devices, and the AC power supply/recharger. The sides of connector cavities 30 have vertically oriented teeth (now shown) molded into the plastic of connector block 10. The top and bottom of cavities 30 have rows of teeth (not shown) which run from left to right in the cavity. These teeth grip the peripheral connector and reduce the potential for the connector to move vertically and horizontally or rotate while in the cavity 20. This reduction of movement assures repeated alignment of the connector and its receptacle or port on the computer. Reference numeral 32 represents a connector cavity 20 which may accept a small computer systems interface (SCSI) connector or external floppy disk drive connector which are provided by Apple or other vendors. This cavity is characterized by the shoulder 34 (seen best in FIG. 5) at the front of the cavity which secures a sliding sleeve on the connector (now shown). The sleeve, which is normally pulled to the rear of the connector to aid in the removal of the connector, remains in the rear position while inside the cutout or cavity 20 in the connector block 10, rather than sliding forward when released by the user. By locking the sleeve in the rear position, the force required for insertion or removal of the connectors is reduced. The opening at the rear of connector block 10 is circular to allow the cable to exit block 10 and provide some strain relief (shown best in FIG. 4). Reference numeral 36 is used for means to secure a peripheral connector of the same type as 30, but with a wider cross-section. Reference numerals 38 are connector cavities 20 positioned along the plane shown at C. These cavities hold plungers 40 and extend out of cavity 38 (shown best in FIG. 8). Plungers 40 allow the user to activate the power, reset and programmer's push switches or buttons which are located on the rear of some models of computers.

Referring now to FIG. 5, a top view of the connector block 10 is shown in which reference numerals 44 are screw fasteners used to connect the upper and lower halves 16 and 18 of connector block 10 together.

FIG. 9 shows a cross-sectional view of connector block 10 taken at through plane C. FIG. 9 more clearly shows that plungers 40 are provided with extensions 46 which fit into extension cutouts 48. As the plunger 40 is pressed by the user to activate a button on the rear of the computer, the extension 46 abuts the walls of cutouts 48 so that when the plunger is released, plunger 40 moves back to its original position. Plungers 40 can be made of any resilient substance, such as rubber or the like.

It should be understood that while the invention has been described in connection with separating connector block halves 16 and 18 to insert peripheral connectors, the peripheral connectors could also be press fit into their respective cavities 20.

This completes the description of the preferred and alternate embodiments of the invention. Those skilled in the art may recognize other equivalents to the specific embodiment described herein which equivalents are intended to be encompassed by the claims attached hereto.

What is claimed is:

1. A connecting device for positioning a plurality of peripheral connectors in relative positions for registration with a plurality of corresponding computer ports, the connecting device comprising:
   a body having a plurality of peripheral connector holding means for securely holding and positioning a plurality of peripheral connectors, each peripheral connector holding means being located in the body so as to position a peripheral connector held therein in a registering position with respect to a predetermined port of the computer,
   whereby the computer ports register for direct attachment and detachment to a plurality of peripheral connectors.

2. The connecting device of claim 1 herein each peripheral connector holding means is comprised of a cutout which is sized so that each peripheral connector may be press fit.

3. The connecting device of claim 1 wherein the body has a top half and a bottom half, the top and bottom halves each having a plurality of cutouts which, when the top half and bottom half are attached form the plurality of peripheral connector holding means, the top half releasably detaching from the bottom half so as to allow the peripheral connectors to be place din the peripheral connector holding means.

4. A connecting device for use in connecting a computer, having a plurality of ports, to its peripherals, the connecting device comprising:

a body having a plurality of peripheral connector holding means for securely holding and positioning a plurality of peripheral connectors, each peripheral connector holding means being located in the body so as to position a peripheral connector held therein in a registering position with respect to a predetermined port of the computer, and alignment means for receiving the computer and positioning its ports with respect to the peripheral connector holding means, for registration with a plurality of peripheral connectors, so that the computers ports may easily and quickly be attached and detached from all its peripherals.

5. The connecting device of claim 4 wherein each peripheral connector holding means is comprised of a cutout which is sized so that each peripheral connector may be press fit.

6. The connecting device of claim 4 wherein the body has a top half and a bottom half, the top and bottom halves each having a plurality of cutouts which, when the top half and bottom half are attached form the plurality of peripheral connector holding means, the top half releasably detaching from the bottom half so as to allow the peripheral connectors to be placed in the peripheral connector holding means.

* * * * *

UNITED STATES PATENT AND TRADEMARK OFFICE
CERTIFICATE OF CORRECTION

PATENT NO. : 5,186,646
DATED : February 16, 1993
INVENTOR(S) : PEDERSON, WILLIAM A.

It is certified that error appears in the above-indentified patent and that said Letters Patent is hereby corrected as shown below:

Col. 4, line 54, delete "herein" and insert -- wherein --

Col. 4, line 64, delete "place din" and insert --placed in--

Col. 3, line 30, delete "0" and insert -- 10 --

Signed and Sealed this

Fourteenth Day of December, 1993

Attest:

BRUCE LEHMAN

Attesting Officer

Commissioner of Patents and Trademarks